(12) United States Patent
Ficke et al.

(10) Patent No.: US 8,415,969 B1
(45) Date of Patent: Apr. 9, 2013

(54) IMPLEMENTING SCREENING FOR SINGLE FET COMPARE OF PHYSICALLY UNCLONABLE FUNCTION (PUF)

(75) Inventors: Joel T. Ficke, Bloomer, WI (US); Grant P. Kesselring, Rochester, MN (US); James D. Strom, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/284,239

(22) Filed: Oct. 28, 2011

(51) Int. Cl.
*H03K 19/00* (2006.01)

(52) U.S. Cl.
USPC .................................. 326/8; 726/26

(58) Field of Classification Search ........................ 326/8
See application file for complete search history.

(56) References Cited

U.S. PATENT DOCUMENTS

| 5,192,701 | A | 3/1993 | Iwasaki |
| 5,907,777 | A | 5/1999 | Joseph et al. |
| 7,366,041 | B2 | 4/2008 | Pan et al. |
| 7,459,958 | B2 | 12/2008 | Barrows et al. |
| 7,671,666 | B2 | 3/2010 | Barrows et al. |
| 7,696,811 | B2 | 4/2010 | Barrows et al. |
| 7,709,901 | B2 | 5/2010 | Li |
| 7,941,673 | B1 * | 5/2011 | Trimberger .................... 713/189 |
| 7,951,678 | B2 | 5/2011 | Anderson et al. |
| 2010/0085075 | A1 * | 4/2010 | Luzzi et al. ........................ 326/8 |
| 2012/0072476 | A1 * | 3/2012 | Bucci et al. .................... 708/270 |

OTHER PUBLICATIONS

Katyal et al, "A New High Precision Low Offset Dynamic Comparator for High Resolution High Speed ADCs," pp. 5-8, APCCAS, 2006.
U.S. Appl. No. 12/823,278, filed Jun. 25, 2010 entitled "Physically Unclonable Function Implemented Through Threshold Voltage Comparison".

\* cited by examiner

*Primary Examiner* — James H Cho
(74) *Attorney, Agent, or Firm* — Joan Pennington

(57) ABSTRACT

A screening method and circuit for implementing a Physically Unclonable Function (PUF), and a design structure on which the subject circuit resides are provided. A plurality of field effect transistors (FETs) is coupled to a low-offset dynamic comparator and is respectively selected to provide a plurality of FET pairs. For each FET pair, a voltage offset to obtain a comparator output transition is identified and recorded. The recorded voltage offset for each FET pair is compared with a margin threshold value. Each FET pair having an identified voltage offset less than the margin threshold value is discarded or disabled for PUF response generation use.

20 Claims, 5 Drawing Sheets

108

| ADDR[N,M] 170 | DAC CODE 172 |
|---|---|
| 1,4 | -3 |
| 1,5 | 1 | ← DISCARD
| 1,6 | 7 |
| 2,4 | -12 |
| 2,5 | -2 | ← DISCARD
| 2,6 | 15 |
| 3,4 | 6 |
| 3,5 | -9 |
| 3,6 | 0 | ← DISCARD

IMPLEMENTING SCREENING FOR SINGLE FET COMPARE OF PHYSICALLY UNCLONABLE FUNCTION (PUF)

FIELD OF THE INVENTION

The present invention relates generally to the data processing field, and more particularly, relates to a method and circuit for implementing screening for single field effect transistor (FET) compare of Physically Unclonable Function (PUF) utilizing a low-offset dynamic comparator, and a design structure on which the subject circuit resides.

DESCRIPTION OF THE RELATED ART

A physical unclonable function (PUF) is a function that is embodied in a physical structure and must be easy to make but practically impossible to duplicate, even given the exact manufacturing process that produced it. In this respect physical unclonable functions (PUFs), which are the hardware analog of a one-way function, or essentially random functions bound to a physical device in such a way that it is computationally and physically infeasible to predict the output of the function without actually evaluating it using the physical device.

A physically unclonable function (PUF) often exploits variations, such as statistical process variation in manufacture or operation, to generate secret keys used in cryptographic operations, chip authentication, and other operations such as random number generation. A device that supports a PUF yields different responses to different challenge inputs. Authentication of a device using a PUF is performed by supplying a challenge input to the device to which the response of an authentic device is known. The response is a result of a function that, by definition, is unclonable. For example, a PUF may result from process variations in the production of otherwise identical devices. As a result of the process variations, the otherwise identical devices may respond with a different series of bits in response to a set of challenge input bits. An expected response to each of one or more sets of challenge inputs is determined empirically for each of the devices by determining a response to each of the one or more sets of challenge bits. A particular device may authenticate itself by providing the expected response to the one or more sets of challenge bits recorded for that particular device.

For example, U.S. patent application Ser. No. 12/823,278 filed Jun. 25, 2010 entitled "Physically Unclonable Function Implemented Through Threshold Voltage Comparison," and assigned to the present assignee, discloses electronic devices and methods to provide and to test a physically unclonable function (PUF) based on relative threshold voltages of one or more pairs of transistors. In a particular embodiment, an electronic device is operable to generate a response to a challenge. The electronic device includes a plurality of transistors, with each of the plurality of transistors having a threshold voltage substantially equal to an intended threshold voltage. The electronic device includes a challenge input configured to receive the challenge. The challenge input includes one or more bits that are used to individually select each of a pair of transistors of the plurality of transistors. The electronic device also includes a comparator to receive an output voltage from each pair of transistors and to generate a response indicating which pair of transistors has the higher output voltage. The output voltage of each pair of transistors varies based on the threshold voltage of each pair of transistors.

While the PUF circuits of the above-identified patent application provide improvements over some known arrangements, the disclosed single FET compare PUF circuits include built-in comparator offset devices in conjunction with a bit-flip signal to determine unstable FET pair combinations. Disadvantages of the disclosed single FET compare PUF circuits are that these circuits are application dependent and not flexible with changing field conditions.

A need exists for a circuit having a mechanism for implementing a physical unclonable function (PUF) that is efficient and effective for defining and screening transistor pairs for use in PUF challenge and response word generation.

SUMMARY OF THE INVENTION

Principal aspects of the present invention are to provide a method and circuit for implementing screening for a single field effect transistor (FET) compare Physically Unclonable Function (PUF) utilizing a low-offset dynamic comparator, and a design structure on which the subject circuit resides. Other important aspects of the present invention are to provide such method, circuit and design structure substantially without negative effects and that overcome many of the disadvantages of prior art arrangements.

In brief, a screening method and circuit for implementing a Physically Unclonable Function (PUF), and a design structure on which the subject circuit resides are provided. A plurality of field effect transistors (FETs) is coupled to a low-offset dynamic comparator and is respectively selected to provide a plurality of FET pairs. For each FET pair, a voltage offset to obtain a comparator output transition is identified and recorded. The recorded voltage offset for each FET pair is compared with a margin threshold value. Each FET pair having an identified voltage offset less than the margin threshold value is discarded or disabled for PUF response generation use.

In accordance with features of the invention, the FET pairs having an identified voltage offset large enough for PUF circuitry use are stored in a table of FET pairs identified by a respective address with the voltage offset represented by a DAC code. Only the stored FET pairs are queried or used for PUF response generation.

In accordance with features of the invention, when more or less margin is needed for an application, a different margin threshold value is selected without requiring redesign or further calibration.

In accordance with features of the invention, a first voltage reference is adjusted to calibrate the low-offset dynamic comparator with each of the plurality of field effect transistors (FETs) turned off. A second voltage reference is adjusted to calibrate each FET pair to obtain each respective voltage offset.

BRIEF DESCRIPTION OF THE DRAWINGS

The present invention together with the above and other objects and advantages may best be understood from the following detailed description of the preferred embodiments of the invention illustrated in the drawings, wherein:

FIGS. 1A, 1B, and 1C together provide a schematic and block diagram representation illustrating an example circuit for implementing screening for a single field effect transistor (FET) compare of Physically Unclonable Function (PUF) utilizing a low-offset dynamic comparator in accordance with a preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and circuit for implementing screening for a single field effect transistor (FET) compare for Physically Unclonable Function (PUF) utilizing a low-offset dynamic comparator, and a design structure on which the subject circuit resides are provided.

Figure 1A:
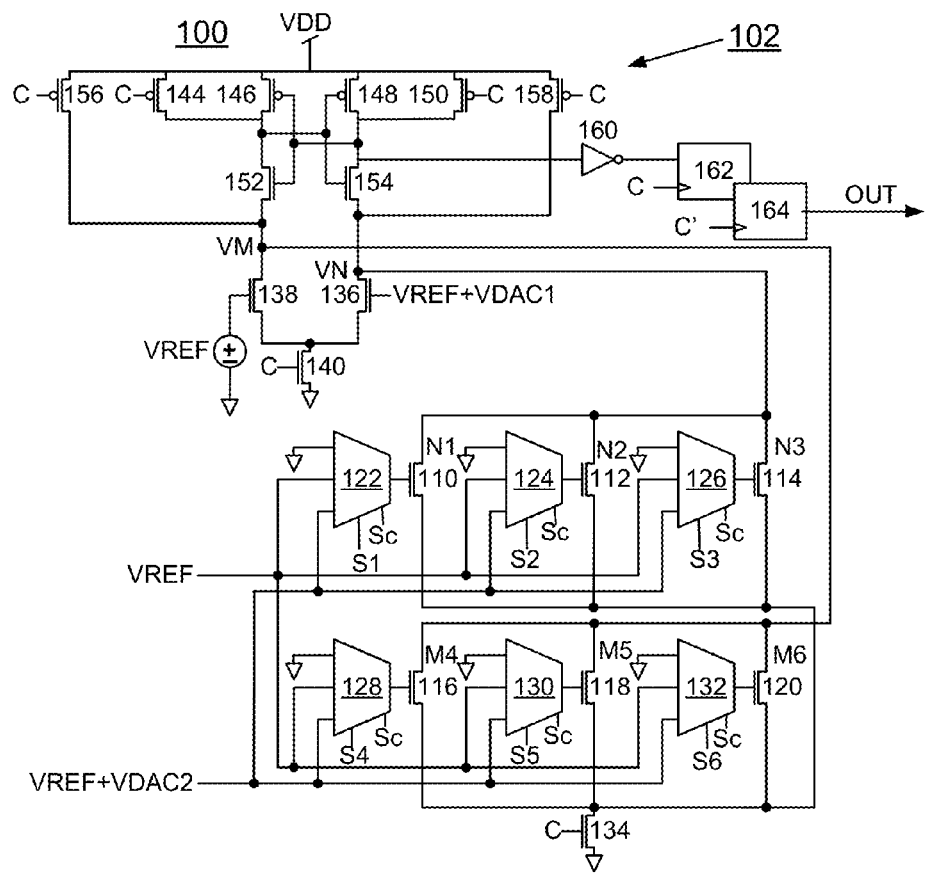
Figure 1B:
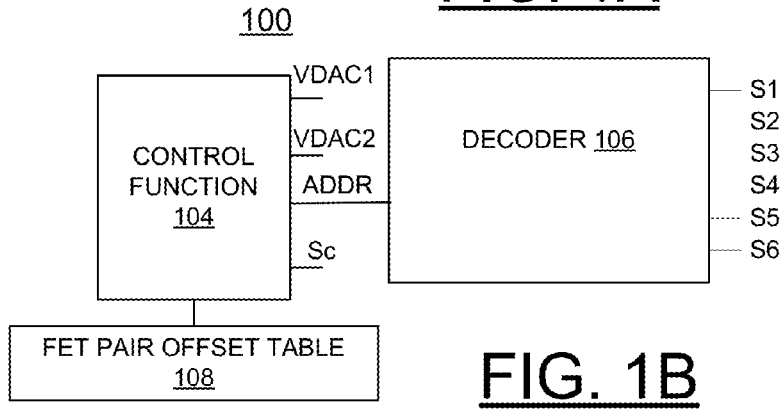

Having reference now to the drawings, in FIGS. 1A, 1B, and 1C, there is shown an example circuit for implementing screening for a single field effect transistor (FET) compare of Physically Unclonable Function (PUF) generally designated by the reference character 100 in accordance with a preferred embodiment.

Figure 2:
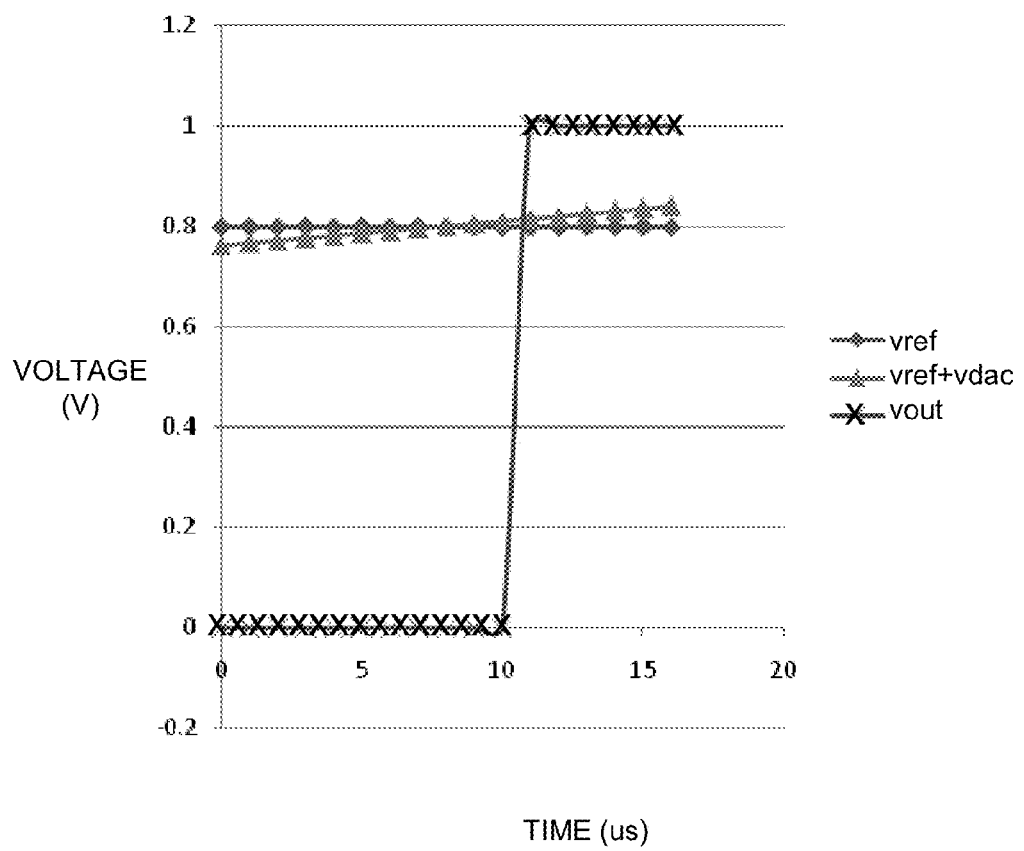
FIG. 2 are example waveforms illustrating an example calibration operation with voltage illustrated with respect to a vertical axis and time illustrated with respect to a horizontal axis in accordance with a preferred embodiment.
Figure 3:
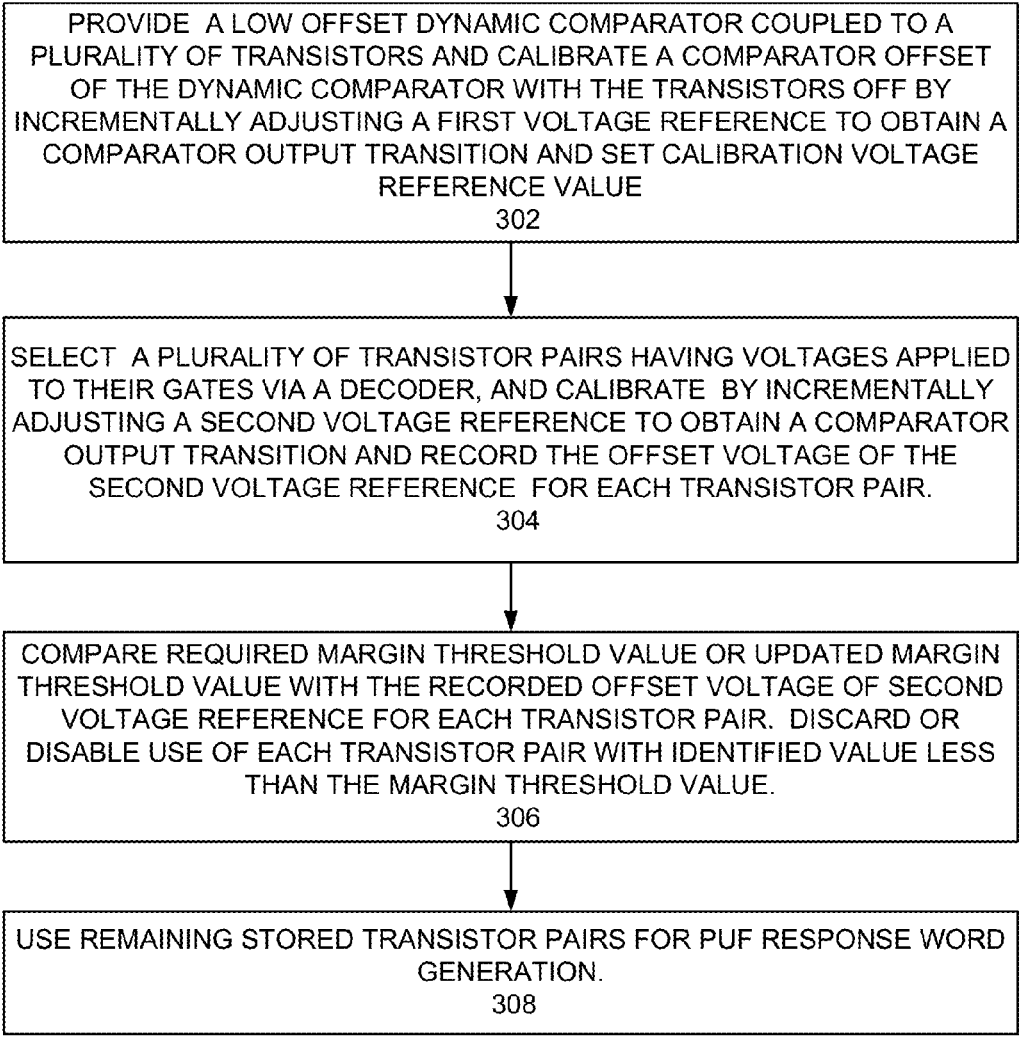
FIG. 3 is a flow diagram illustrating example operations of the circuit of FIG. 1 for implementing screening for a single field effect transistor (FET) compare of Physically Unclonable Function (PUF) in accordance with a preferred embodiment.

PUF circuit 100 includes a low-offset dynamic comparator generally designated by the reference character 102, and a control block 104 performing control operations as illustrated and described with respect to FIGS. 2 and 3. The control block 104 applies addresses for a plurality of PUF transistor pairs to a decode 106, provides a calibration select Sc, calibration voltages VDAC1, VDAC2, and stores identified offset voltage values for the plurality of selected PUF transistor pairs in a FET pair offset table 108. A variation of offset voltage values is exploited to create a Physically Unclonable Function or PUF.

PUF circuit 100 includes a plurality of N-channel field effect transistors (NFETs) N1-N3, 110, 112, 114 and NFETs M4-M6, 116, 118, 120, coupled to the low-offset dynamic comparator 102. Each of the NFETs N1-N3, 110, 112, 114 and NFETs M4-M6, 116, 118, 120 has a gate input applied by a respective multiplexer 122, 124, 126, 128, 130, 132 responsive to a respective decoder applied select signal S1-S6, as shown. The multiplexers 122, 124, 126, 128, 130, 132 are analog multiplexers capable of passing analog voltages. The calibration select Sc is applied to the analog multiplexers 122, 124, 126, 128, 130, 132 to turn off each of the NFETs N1-N3, 110, 112, 114 and NFETs M4-M6, 116, 118, 120 with an applied ground gate input during calibration of the a low-offset dynamic comparator 102.

Each analog multiplexer 122, 124, 126, 128, 130, 132 includes a first input VREF and a second input VREF+VDAC2, each respectively applied to a gate input of one NFET of a selected NFET pair. For example, for a selected FET pair, such as N1, M4, the respective voltage VREF is applied to a gate of NFET N1, 110, and the voltage VREF+VDAC2 is applied to a gate of NFET M4, 116. Each of the NFETs N1-N3, 110, 112, 114 and NFETs M4-M6, 116, 118, 120 is coupled to ground via a series connected NFET 134 having a gate input connected to a clock input C.

Each of the NFETs N1-N3, 110, 112, 114 is connected to a first node VN of the low-offset dynamic comparator 102. Each of the NFETs M4-M6, 116, 118, 120 is connected to a second node VM of the low-offset dynamic comparator 102.

The low-offset dynamic comparator 102 includes a pair of NFETs 136, 138 connected to the respective nodes VN, VM and coupled to ground via a series connected NFET 140 having a gate input connected to the clock input C. The voltage reference VREF is applied to the gate of NFET 138, and a voltage input VREF+VDAC1 is applied to the gate of NFET 136.

The low-offset dynamic comparator 102 includes a plurality of cross coupled transistor pairs including P-channel field effect transistors (PFETs) 144, 146, and PFETs 148, 150 and NFETS 152, 154 connected between a voltage supply rail VDD and the respective first node VN, and second node VM. The low-offset dynamic comparator 102 includes a transistor pair including PFETs 156, 158 connected between a voltage supply rail VDD and the respective first node VN, and second node VM. PFETs 144, 150, 156 and 158 have a gate input connected to the clock input C.

The common drain connection between PFET 148 and NFET 154 is applied to an inverter 160 coupled to a pair of latches 162, 164 respectively receiving the clock input C, and an opposite clock phase input C' with the second latch 164 providing a dynamic comparator output of the low-offset dynamic comparator 102 labeled OUT.

Referring to FIG. 1C, there is shown an example FET pair offset table 108 including an ADDR[M,N] 170 received by the decoder 106 determining the NFET pair selected by select signals S1-S6 and a DAC Code 172 providing an example offset voltage corresponding to an applied VDAC2 voltage.

In accordance with features of the invention, by using the two independent Vdac voltages VDAC1, and VDAC2, the comparator offset is effectively zeroed and an offset voltage for each FET pair is effectively identified.

Referring to FIG. 2, there are shown example waveforms illustrating an example sweep calibration operation respectively using the two independent Vdac voltages VDAC1, and VDAC2 with voltage illustrated with respect to a vertical axis and time illustrated with respect to a horizontal axis in accordance with a preferred embodiment.

For example, the low-offset dynamic comparator 102 is calibrated by first holding the gates of NFETs N1-N3, 110, 112, 114 and NFETs M4-M6, 116, 118, 120 low and VDAC1 is incrementally swept, or varied through alternate algorithms such as binary search, from a negative voltage to a positive voltage until the output voltage changes polarity, as illustrated in FIG. 2. The VDAC1 setting nearest the output transition is then held constant as the comparator zero-offset point for the low-offset dynamic comparator 102.

Next each NFET pair combination of NFETs N1-N3, 110, 112, 114 and NFETs M4-M6, 116, 118, 120 (N1 and M4, N1 and M5, . . . N3 and M6) have voltages applied to their gates through the decoder 106, VREF to one NFET and VREF+VDAC2 to the other NFET, and the calibration process is repeated except this time VDAC2 is the voltage being swept.

For each NFET pair, the zero-offset voltage on VDAC2 is recorded, for example, as shown in FIG. 1C.

Referring to FIG. 3, there are shown example operations of the circuit 100 for implementing screening for a single field effect transistor (FET) compare for PUF circuit 100 in accordance with a preferred embodiment.

As indicated at a block 302, a low offset dynamic comparator coupled to a plurality of transistors is provided and calibrated, such as the illustrated example low offset dynamic comparator 102 coupled to a plurality of transistors NFETs N1-N3, 110, 112, 114 and NFETs M4-M6, 116, 118, 120. As described above, the gates of transistors NFETs N1-N3, 110, 112, 114 and NFETs M4-M6, 116, 118, 120 are held low, and the low-offset dynamic comparator 102 is calibrated with the VDAC1 being incrementally swept from a negative voltage to a positive voltage until the output voltage changes polarity and the VDAC1 setting nearest the output transition is then held constant as the comparator zero-offset point for the low-offset dynamic comparator 102.

Next a plurality of transistor pairs are selected having voltages applied to their gates via a decoder and the transistor pairs are calibrated by incrementally adjusting a second voltage reference, such as VDAC2 is swept to obtain a comparator output transition and the offset voltage of the second voltage reference is recorded for each transistor pair, as indicated at a block 304.

As indicated at a block 306, each of the recorded offset voltage of each transistor pair is compared with a required margin threshold value or updated margin threshold value, and each identified value less than the margin threshold value is discarded or disabled for PUF use. For example, assume each VDAC2 setting is equivalent to 5 mV and that the particular application requires an overall margin of at least 10 mV to account for all variation, degradation effects, and the like. In this case, any pair with an absolute offset value or |DAC code|>2 will be considered stable.

Referring again to the example FET pair offset table 108 in FIG. 1C, three of the 9 NFET pairs are marked as DISCARD, identified as unstable having a DAC code less than 2, and should not be used. If after field characterization it is determined more or less margin is required, a different DAC code threshold is selected without requiring redesign or further calibration.

As indicated at a block 308, following the FET pair calibration and compare steps, the resulting stored table without any entries marked DISCARD, such as shown in the example FET pair offset table 108 in FIG. 1C is used to select stable NFET pairs for use in PUF response word generation.

Figure 4:
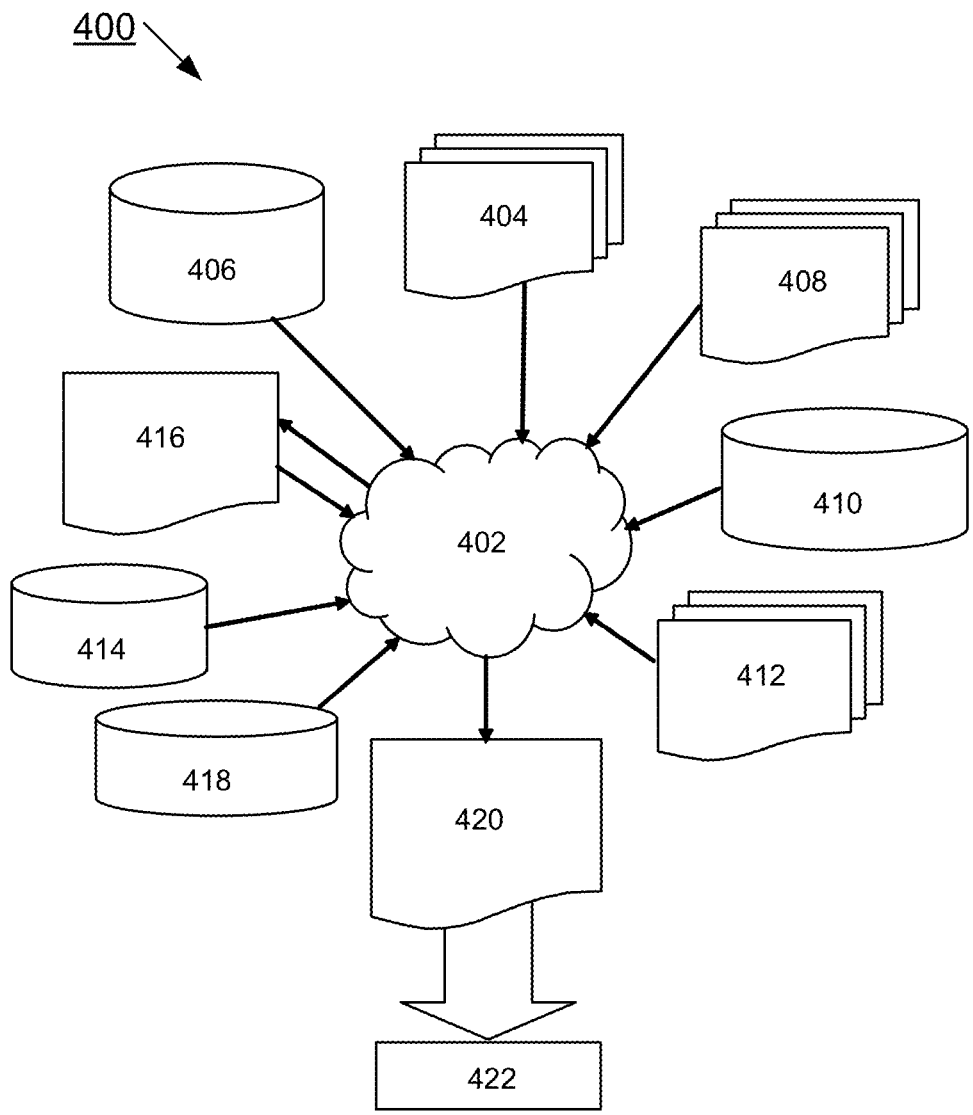
FIG. 4 is a flow diagram of a design process used in semiconductor design, manufacturing, and/or test.

FIG. 4 is a flow diagram of a design process used in semiconductor design, manufacturing, and/or test. FIG. 4 shows a block diagram of an example design flow 400. Design flow 400 may vary depending on the type of IC being designed. For example, a design flow 400 for building an application specific IC (ASIC) may differ from a design flow 400 for designing a standard component. Design structure 402 is preferably an input to a design process 404 and may come from an IP provider, a core developer, or other design company or may be generated by the operator of the design flow, or from other sources. Design structure 402 comprises circuit 100 in the form of schematics or HDL, a hardware-description language, for example, Verilog, VHDL, C, and the like. Design structure 402 may be contained on one or more machine readable medium. For example, design structure 402 may be a text file or a graphical representation of circuit 100. Design process 404 preferably synthesizes, or translates, circuit 100 into a netlist 406, where netlist 406 is, for example, a list of wires, transistors, logic gates, control circuits, I/O, models, etc. that describes the connections to other elements and circuits in an integrated circuit design and recorded on at least one of machine readable medium. This may be an iterative process in which netlist 406 is resynthesized one or more times depending on design specifications and parameters for the circuit.

Design process 404 may include using a variety of inputs; for example, inputs from library elements 404 which may house a set of commonly used elements, circuits, and devices, including models, layouts, and symbolic representations, for a given manufacturing technology, such as different technology nodes, 32 nm, 45 nm, 90 nm, and the like, design specifications 410, characterization data 412, verification data 414, design rules 416, and test data files 418, which may include test patterns and other testing information. Design process 404 may further include, for example, standard circuit design processes such as timing analysis, verification, design rule checking, place and route operations, and the like. One of ordinary skill in the art of integrated circuit design can appreciate the extent of possible electronic design automation tools and applications used in design process 404 without deviating from the scope and spirit of the invention. The design structure of the invention is not limited to any specific design flow.

Design process 404 preferably translates embodiments of the invention as shown in 1A, 1B, and 1C, along with any additional integrated circuit design or data (if applicable), into a second design structure 420. Design structure 420 resides on a storage medium in a data format used for the exchange of layout data of integrated circuits, for example, information stored in a GDSII (GDS2), GL1, OASIS, or any other suitable format for storing such design structures. Design structure 420 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in 1A, 1B, and 1C. Design structure 420 may then proceed to a stage 422 where, for example, design structure 420 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A method for implementing physically unclonable function (PUF) circuit screening, said method comprising:
providing a low-offset dynamic comparator;
providing a plurality of field effect transistors (FETs) coupled to the low-offset dynamic comparator;
selecting a plurality of FET pairs; calibrating each selected FET pair, identifying and recording a voltage offset to obtain a comparator output transition;
comparing each said recorded voltage offset for each FET pair with a margin threshold value; and
disabling each FET pair having an identified voltage offset less than said margin threshold value for PUF use.

2. The method as recited in claim 1 includes adjusting a first voltage reference to obtain a comparator output transition to calibrate the low-offset dynamic comparator.

3. The method as recited in claim 2 includes holding each of said plurality of field effect transistors (FETs) turned off.

4. The method as recited in claim 2 includes adjusting a second voltage reference to calibrate each FET pair to obtain each said respective voltage offset.

5. The method as recited in claim 1 wherein comparing each said recorded voltage offset for each FET pair with a margin threshold value includes updating said margin threshold value.

6. The method as recited in claim 1 includes storing each of said FET pairs having an identified voltage offset greater than said margin threshold value in a table of FET pairs identified by a respective address together with the identified voltage offset for PUF response word generation use.

7. A circuit for implementing physically unclonable function (PUF) circuit screening comprising:
a dynamic comparator;
a plurality of field effect transistors (FETs) coupled to said dynamic comparator;
a control function;
a decoder coupled to said control function selecting a plurality of FET pairs;
said control function calibrating each FET pair, identifying and recording a voltage offset to obtain a comparator output transition for each selected FET pair,
said control function comparing each said recorded voltage offset for each FET pair with a margin threshold value; and disabling each FET pair having an identified voltage offset less than the margin threshold value for PUF use.

8. The circuit as recited in claim 7 includes a FET pair offset table storing said FET pairs identified by a respective address with the voltage offset greater than said margin threshold value.

9. The circuit as recited in claim 7 includes said control function calibrating said dynamic comparator by adjusting a first voltage reference of said dynamic comparator to obtain a comparator output transition.

10. The circuit as recited in claim 9 wherein said control function calibrating said dynamic comparator includes said control function holding each of said plurality of field effect transistors (FETs) turned off.

11. The circuit as recited in claim 9 wherein said control function calibrating each FET pair, identifying and recording said voltage offset to obtain said comparator output transition for each selected FET pair includes said control function adjusting a second voltage reference applied to a gate of one FET of said selected FET pair to obtain each said respective voltage offset.

12. The circuit as recited in claim 7 further includes said control function comparing each said recorded voltage offset for each FET pair with an updated margin threshold value.

13. The circuit as recited in claim 7 includes said control function storing said FET pairs with the voltage offset having an identified voltage offset greater than said margin threshold value for PUF response word generation use.

14. A design structure embodied in a non-transitory machine readable storage medium used in a design process, the design structure comprising:
a circuit tangibly embodied in the non-transitory machine readable storage medium used in the design process, said circuit for implementing a physically unclonable function (PUF), said circuit comprising:
a dynamic comparator;
a plurality of field effect transistors (FETs) coupled to said dynamic comparator;
a control function;
a decoder coupled to said control function selecting a plurality of FET pairs;
said control function calibrating each FET pair, identifying and recording a voltage offset to obtain a comparator output transition for each selected FET pair,
said control function comparing each said recorded voltage offset for each FET pair with a margin threshold value; and disabling each FET pair having an identified voltage offset less than the margin threshold value for PUF use, wherein the design structure, when read and used in the manufacture of a semiconductor chip produces a chip comprising said circuit.

15. The design structure of claim 14, wherein the design structure comprises a netlist, which describes said circuit.

16. The design structure of claim 14, wherein the design structure resides on storage medium as a data format used for the exchange of layout data of integrated circuits.

17. The design structure of claim 14, wherein the design structure includes at least one of test data files, characterization data, verification data, or design specifications.

18. The design structure of claim 14, includes a FET pair offset table storing said FET pairs identified by a respective address with the voltage offset greater than said margin threshold value.

19. The design structure of claim 14, includes said control function calibrating said dynamic comparator by adjusting a first voltage reference of said dynamic comparator to obtain a comparator output transition.

20. The design structure of claim 14, wherein said control function calibrating each FET pair, identifying and recording said voltage offset to obtain said comparator output transition for each selected FET pair includes said control function adjusting a second voltage reference applied to a gate of one FET of said selected FET pair to obtain each said respective voltage offset.

* * * * *